United States Patent
Lee et al.

(10) Patent No.: US 11,299,121 B2
(45) Date of Patent: Apr. 12, 2022

(54) AUTOMOTIVE SIDE AIRBAG AND METHOD OF OPERATING SAME

(71) Applicant: HYUNDAI MOBIS CO., LTD., Seoul (KR)

(72) Inventors: Jong Seob Lee, Suwon-si (KR); Kum Ho Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/131,053

(22) Filed: Dec. 22, 2020

(65) Prior Publication Data
US 2021/0237677 A1     Aug. 5, 2021

(30) Foreign Application Priority Data

Jan. 30, 2020    (KR) ................ 10-2020-0011162

(51) Int. Cl.
| | |
|---|---|
| *B60R 21/207* | (2006.01) |
| *B60R 21/231* | (2011.01) |
| *B60R 21/232* | (2011.01) |
| *B60R 21/21* | (2011.01) |
| *B60R 21/213* | (2011.01) |
| *B60R 21/26* | (2011.01) |
| *B60R 21/01* | (2006.01) |

(52) U.S. Cl.
CPC .......... *B60R 21/232* (2013.01); *B60R 21/207* (2013.01); *B60R 21/21* (2013.01); *B60R 21/213* (2013.01); *B60R 21/23138* (2013.01); *B60R 21/26005* (2013.01); *B60R 2021/01225* (2013.01); *B60R 2021/2078* (2013.01); *B60R 2021/23146* (2013.01)

(58) Field of Classification Search
None
See application file for complete search history.

(56) References Cited

U.S. PATENT DOCUMENTS 9,821,749 B2 * 11/2017 Hotta ................ B60R 21/23138
9,849,857 B2 * 12/2017 Fujiwara ............... B60R 21/233

FOREIGN PATENT DOCUMENTS

| JP | H10100827 A | * | 4/1998 |
| JP | 2017119497 A | * | 7/2017 |
| KR | 20-0431748 Y1 | | 11/2006 |

\* cited by examiner

*Primary Examiner* — Faye M Fleming
(74) *Attorney, Agent, or Firm* — DLA Piper LLP (US)

(57) ABSTRACT

Proposed is an automotive side airbag including: an inflator ejecting gas when operating; an air cushion expanded and unfolded forward from a side of a passenger by the gas ejected from the inflator; and a diffuser disposed in the air cushion, supplying the gas ejected from the inflator to the air cushion, and having a discharge hole formed across a direction in which the air cushion is unfolded by the supplied gas.

11 Claims, 7 Drawing Sheets

[FIG. 1]
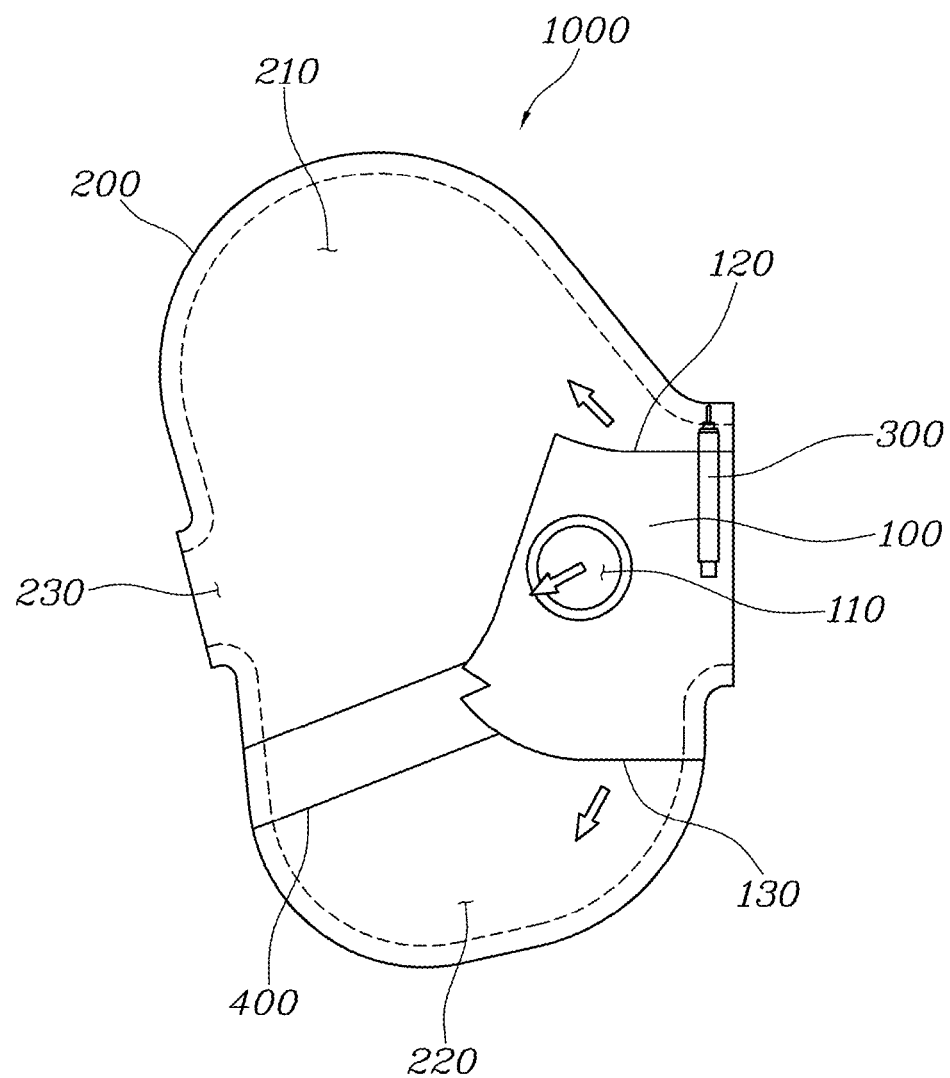

[FIG. 2]
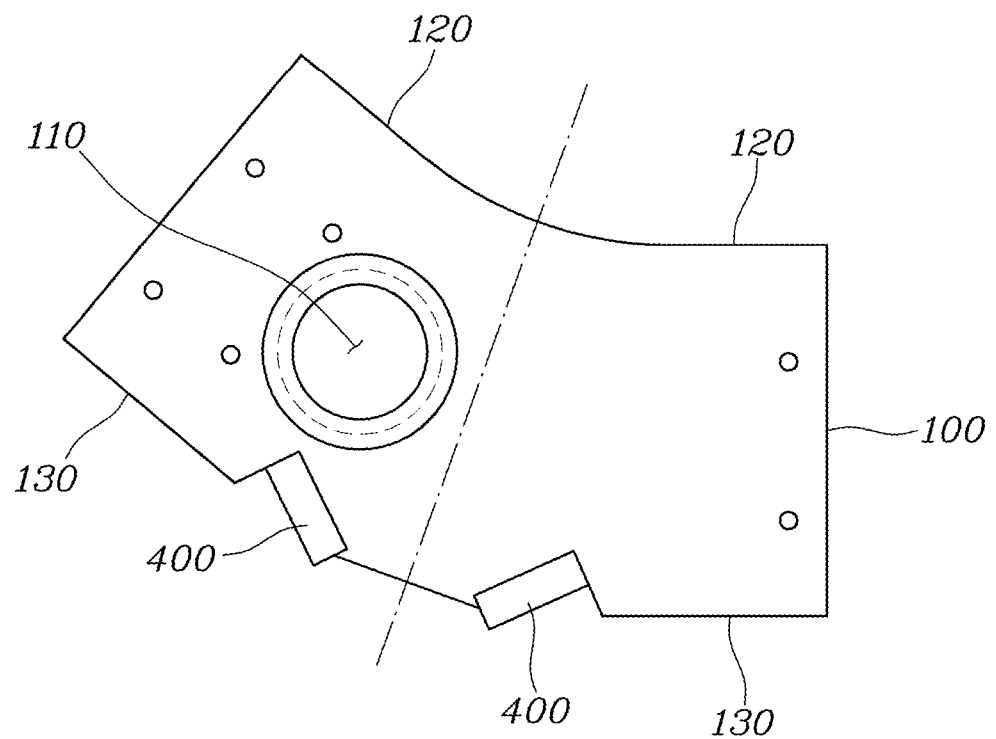

[FIG. 3]
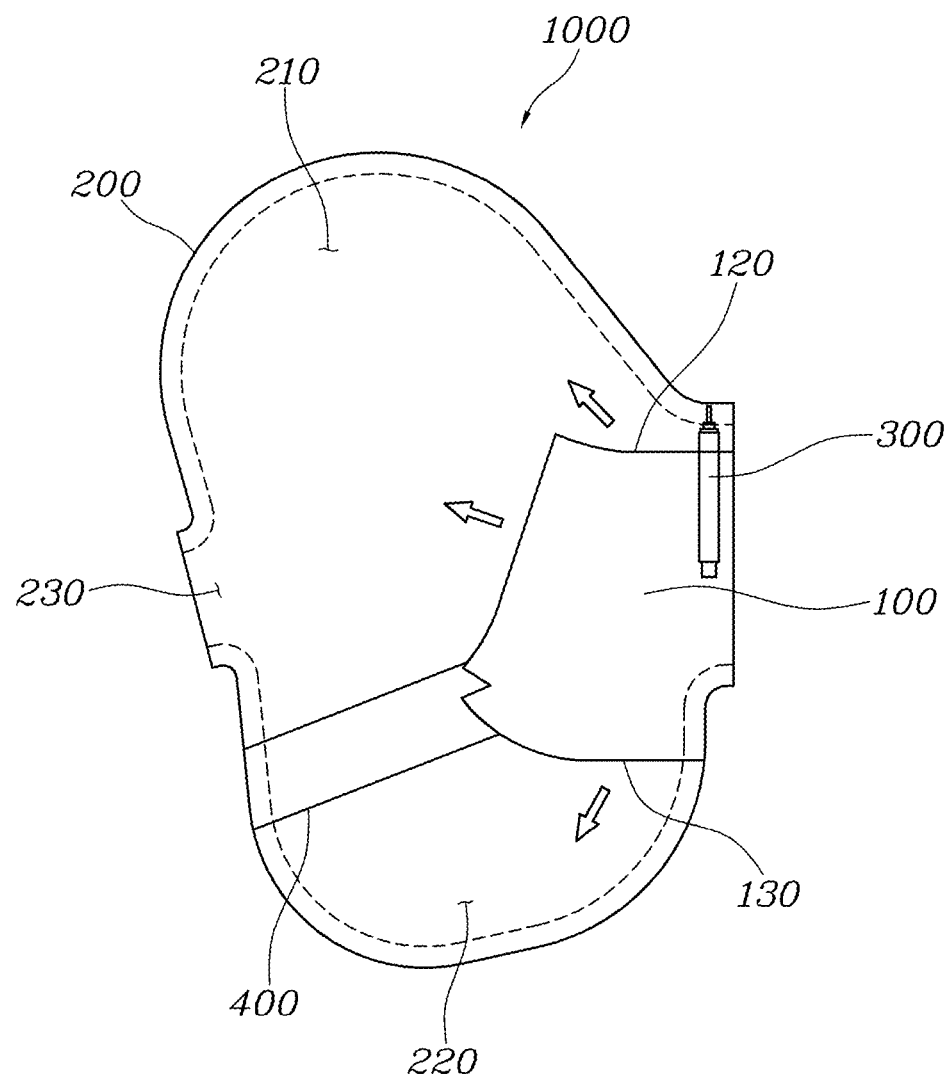

[FIG. 4]
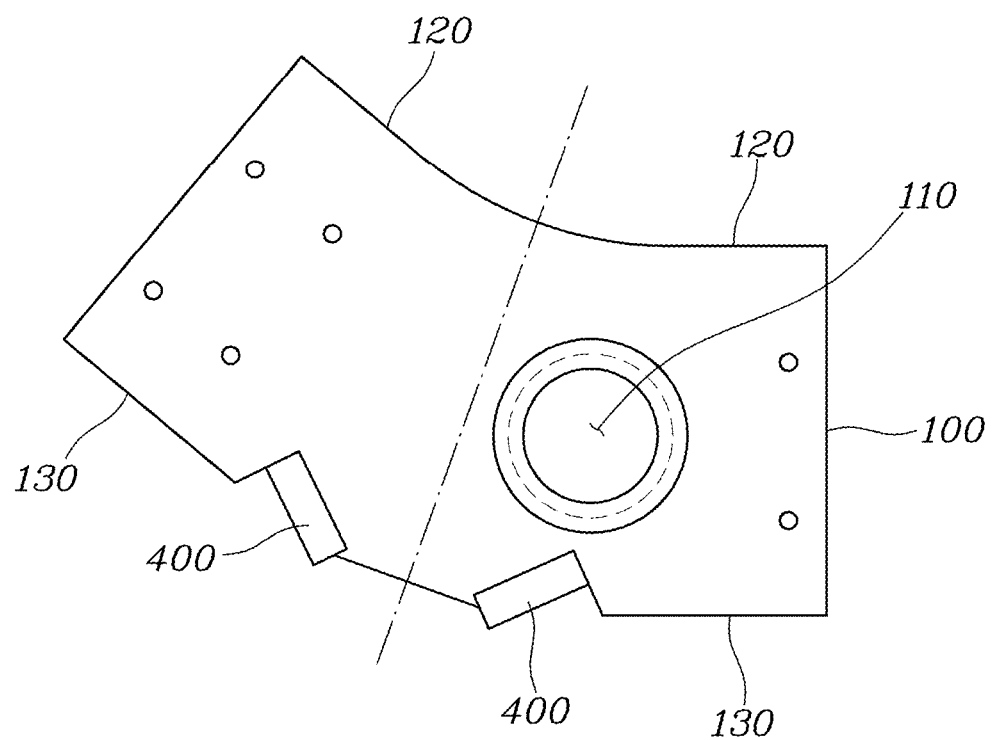

[FIG. 5]
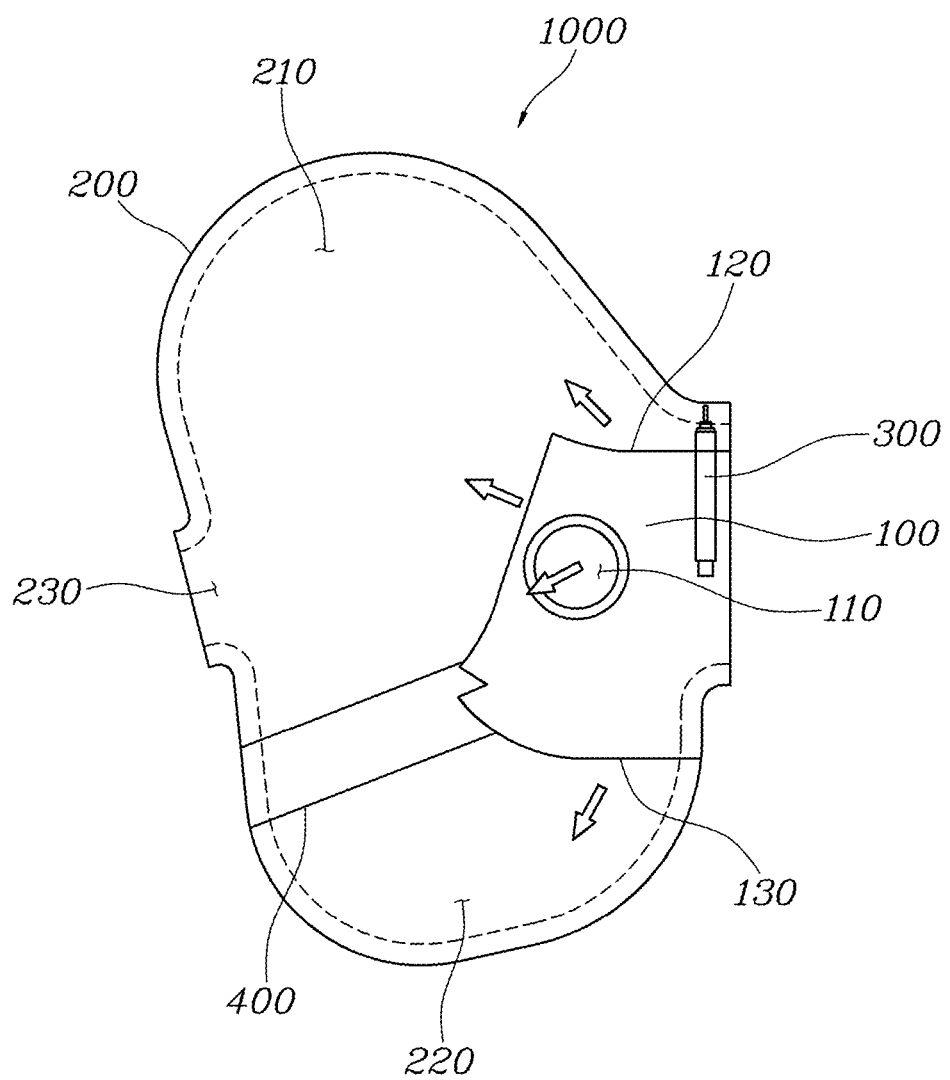

[FIG. 6]
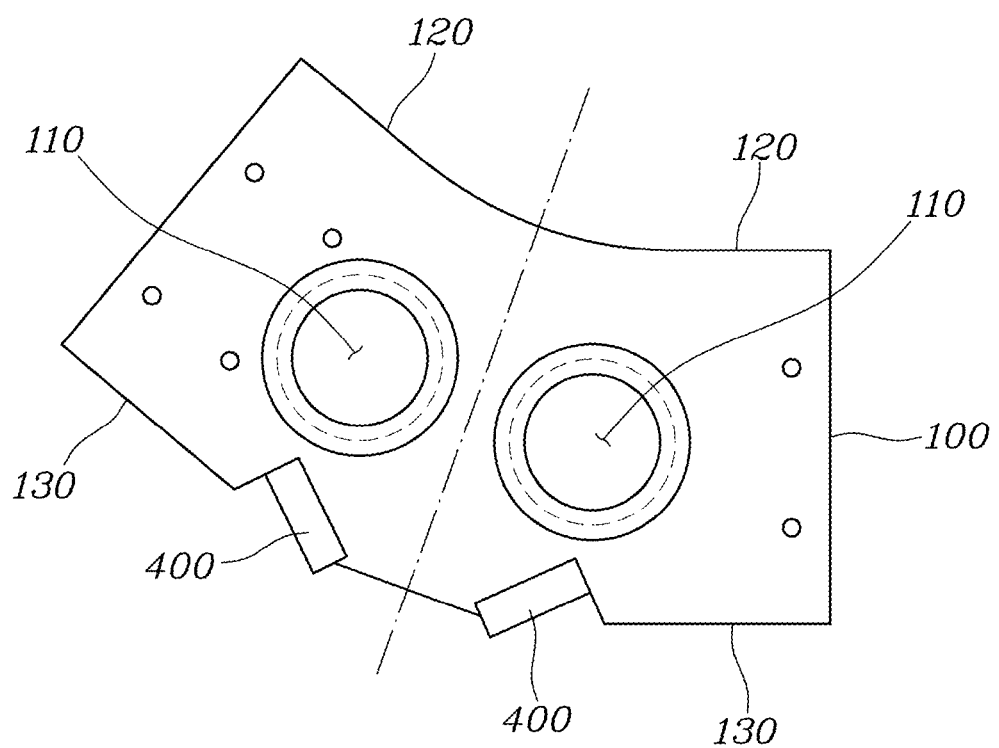

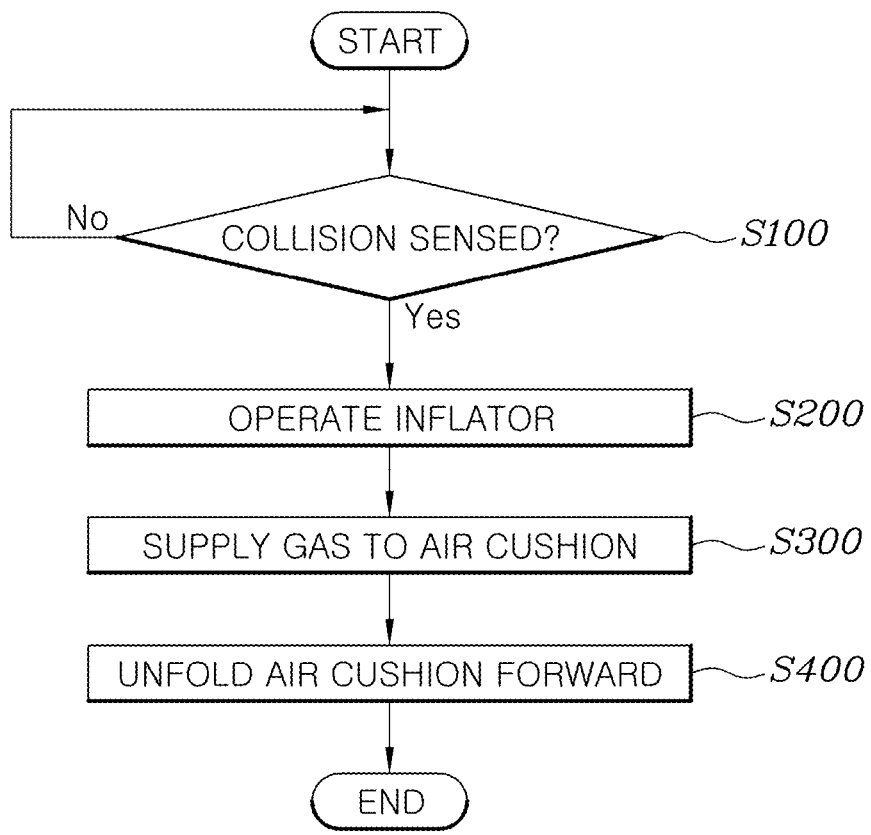
[FIG. 7]

AUTOMOTIVE SIDE AIRBAG AND METHOD OF OPERATING SAME

CROSS REFERENCE TO RELATED APPLICATION

The present application claims priority to Korean Patent Application No. 10-2020-0011162, filed Jan. 30, 2020, the entire contents of which is incorporated herein for all purposes by this reference.

BACKGROUND OF THE INVENTION

Field of the Invention

The present invention relates to an automotive side airbag and a method of operating the automotive side airbag and, more particularly, to a technology about an airbag that can be mounted at the driver seat and a passenger seat to protect the side of a passenger in a collision of a vehicle.

Description of the Related Art

An airbag is a representative device for protecting a passenger with the seatbelt and an airbag system is a system for protecting a passenger with a shock-absorbing ability by inflating due to the pressure of gas supplied into an airbag cushion in a collision of a vehicle. The airbag system is generally classified into a driver airbag system mounted in the steering wheel, a passenger airbag system mounted over the glove box, a knee airbag system mounted in the instrument panel, a curtain airbag system mounted along the roof rail, and a side airbag system mounted in a side of a seat.

In these systems, the side airbag system protects a side of a passenger from the chest to the buttocks by inflating forward from a side of a seat in a side collision, a front collision, and overturn of a vehicle. The side airbag system may be mounted at only the front seats or may be mounted at all the front seats and rear seats, depending on cases.

The description provided above as a related art of the present invention is just for helping understanding the background of the present invention and should not be construed as being included in the related art known by those skilled in the art.

SUMMARY OF THE INVENTION

An objective of the present invention is to provide an automotive side airbag that can improve the performance of preventing the chest of a passenger from being injured by inflating and lifting a passenger's arm to prevent the passenger's arm from interfering with and pressing against the chest in a side collision of a vehicle.

In order to achieve the objectives, the present invention provides an automotive side airbag including: an inflator ejecting gas when operating; an air cushion expanded and unfolded forward from a side of a passenger by the gas ejected from the inflator; and a diffuser disposed in the air cushion, supplying the gas ejected from the inflator to the air cushion, and having a discharge hole formed across a direction in which the air cushion is unfolded by the supplied gas.

The air cushion may expand toward a passenger or outward the passenger, and the discharge hole may be formed in an expansion direction of the air cushion.

The air cushion may unfold forward while expanding in a direction crossing the direction in which the air cushion unfolds.

When the air cushion unfolds, an arm of a passenger may be lifted diagonally upward.

The discharge hole of the diffuser may be formed toward a passenger or outward from the passenger.

The discharge hole of the diffuser may be formed as a plurality of pieces toward a passenger or outward from the passenger.

The automotive side airbag may further include a separator dividing an internal space of the air cushion into an upper chamber and a lower chamber, in which the diffuser may communicate with both of the upper chamber and the lower chamber.

A first assistant hole for supplying gas to the upper chamber and a second assistant hole for supplying gas to the lower chamber may be formed at the diffuser.

The discharge hole of the diffuser may communicate with an inside of the upper chamber.

The upper chamber may cover the chest or the stomach of a passenger when unfolding, and the lower may chamber cover the pelvis of the passenger when unfolding.

The separator may be coupled to an outer side of the diffuser under the discharge hole.

In order to achieve the objectives, the present invention provides a method of operating the automotive side airbag, the method including: sensing a collision of a vehicle; operating the inflator to eject gas into the air cushion when a collision is sensed; and supplying gas into the air cushion through the discharge hole of the diffuser formed across the direction in which the air cushion unfolds.

The method may further include unfolding the air cushion forward from a side of a passenger after the supplying of gas.

According to the present invention, the side airbag lifts up an arm of a passenger while inflating in a side collision of a vehicle, thereby preventing the passenger's arm from interfering with and pressing against the chest. Accordingly, it is possible to improve the performance for preventing a passenger from being injured.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a view showing an automotive side airbag according to an embodiment of the present invention;

FIG. 2 is a view showing a diffuser shown in FIG. 1;

FIG. 3 is a view showing an automotive side airbag according to another embodiment of the present invention;

FIG. 4 is a view showing a diffuser shown in FIG. 3;

FIG. 5 is a view showing an automotive side airbag according to another embodiment of the present invention;

FIG. 6 is a view showing a diffuser shown in FIG. 5; and

FIG. 7 is a view showing a method of operating an automotive side airbag according to an embodiment of the present invention.

DETAILED DESCRIPTION OF THE INVENTION

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, but these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

The present invention will be described hereafter in detail by describing exemplary embodiments of the present invention with reference to the accompanying drawings. Like reference numerals given in the drawings indicate like components.

Referring to FIGS. 1 to 6, an embodiment of an automotive side airbag 1000 of the present invention includes: an inflator 300 ejecting gas when operating; an air cushion 200 expanded and unfolded forward from a side of a passenger by the gas ejected from the inflator 300; and a diffuser 100 disposed in the air cushion 200, supplying the gas ejected from the inflator 300 to the air cushion 200, and having a discharge hole 110 formed across a direction in which the air cushion 200 is unfolded by the supplied gas.

That is, the present invention relates to a device mounted in a side of a seat in a vehicle and protecting a side of a passenger from a door structure in a collision of the vehicle, in which a collision is sensed by a sensor in a car accident, a gas producer is ignited in the inflator 300, whereby gas can be ejected. The gas can be supplied into the air cushion 200 through the diffuser 100 disposed around the inflator 300 in the air cushion 200.

That is, the diffuser 100 has a plurality of holes and the gas discharged from the inflator 300 flows into the air cushion 200 through the holes, whereby the air cushion 200 can expand.

Accordingly, the air cushion 200 is expanded and protruded toward the front of a vehicle from a side of a seat to be positioned between a passenger and a door by the gas produced from the inflator 300, thereby protecting a side from the chest to the pelvis of the passenger.

As shown in FIG. 1, the side airbag further includes a separator 400 dividing the internal space of the air cushion 200 into an upper chamber 210 and a lower chamber 220, and the diffuser 100 may communicate with both of the upper chamber 210 and the lower chamber 220.

That is, the separator 400 may be disposed between the air cushion 200 and the diffuser 100, and the diffuser 100 may have a first assistant hole 120 for supplying gas to the upper chamber 210 and a second assistant hole 130 for supplying gas to the lower chamber 220.

A vent hole 230 may be formed at the upper chamber 210 of the air cushion 200 supplied with gas from the first assistant hole 120 of the diffuser 100 so that the gas can be discharged to the front of a vehicle.

The air cushion 200 is manufactured by fitting two panels flat and sewing the edges. The vent hole 230 may be formed by not sewing a portion of the two panels facing the front of a vehicle when fitting the two panels and sewing the edges to manufacture the air cushion 200. The vent hole 230 discharges the gas from the upper chamber 210 after the air cushion 200 is unfolded by an appropriate unfolding pressure, whereby it is possible to prevent a passenger from being injured by excessive unfolding pressure of the air cushion 200.

The air cushion 200 can be expanded and unfolded forward from a side of a passenger by the gas ejected from the inflator 300. Since the discharge hole 110 is formed at the diffuser 100 across the unfolding direction of the air cushion 200, the air cushion 200 can expand toward a passenger or outward from the passenger. That is, the discharge hole 110 of the diffuser 100 may be formed in the expansion direction of the air cushion 200.

The air cushion 200 can unfold forward while expanding across the unfolding direction.

The discharge hole 110 of the diffuser 100 may be formed toward a passenger or outward from a passenger, as show in FIGS. 1 to 4.

Alternatively, as shown in FIGS. 5 and 6, a plurality of discharge holes 110 may be formed at the diffuser 110 toward a passenger or outward from the passenger.

As shown in FIGS. 1 to 4, the gas ejected from the inflator 300 flows into the upper chamber 210 and the lower chamber 220 of the air cushion 220 through the first assistant hole 120 and the second assistant hole 130 of the diffuser 100, so the air cushion 200 can unfold toward the front of a vehicle and toward a side of a passenger or outward from the passenger by the discharge hole 110 of the diffuser 100.

That is, when the air cushion 200 unfolds, an arm of a passenger can be lifted diagonally upward. The air cushion 200 lifts up an arm of a passenger while inflating, thereby preventing the passenger's arm from interfering with and pressing against the chest. Accordingly, it is possible to improve the performance for preventing a passenger from being injured.

Alternatively, as shown in FIG. 5, the gas ejected from the inflator 300 flows into the upper chamber 210 and the lower chamber 220 of the air cushion 220 through the first assistant hole 120 and the second assistant hole 130 of the diffuser 100, so the air cushion 200 can unfold toward the front of a vehicle and toward a side of a passenger or outward from the passenger by the discharge holes 110 of the diffuser 100. Accordingly, the air cushion 200 can lift an arm of a passenger diagonally upward when unfolding.

As shown in FIGS. 1 to 6, the separator 400 may be coupled to the outer side of the diffuser 100 under the discharge hole 110.

That is, the separator 400 may be disposed between the diffuser 100 and the air cushion 200 and any one of both ends of the separator 400 is not coupled, so the upper chamber 210 and the lower chamber 220 of the air cushion can communicate with each other.

The separator 400 can control the unfolding direction of the air cushion 200. That is, the separator 400 can limit the distance between the diffuser 100 and the air cushion 200 when the air cushion 200 unfolds forward or laterally, and can prevent a passenger from being injured by excessive unfolding pressure of the air cushion 200.

The diffuser 100 is in the state shown in FIGS. 2, 4, and 6 when gas is not produced in the inflator 300.

That is, there is no car accident and gas is not produced in the inflator 300, the diffuser 100 may be in the state folded along the dotted line. When the diffuser 100 is inflated and expanded by gas ejected from the inflator 300, gas can be supplied into the upper chamber 210 and the lower chamber 220 of the air cushion through the first assistant hole 120, the second assistant hole 130, and the discharge hole 110.

The discharge hole 110 of the diffuser 100 may be formed at a position where it can communicate with the inside of the upper chamber 210 of the air cushion 200.

That is, the diffuser 100 is inflated by gas initially ejected from the inflator 300 and the gas in the diffuser 100 flows into both of the upper chamber 210 and the lower chamber 220 through the first assistant hole 120, the second assistant hole 130, and the discharge hole 110. However, since the lower chamber 220 is smaller in volume than the upper chamber 210, gas pressure increases earlier in the lower chamber 220, so the gas pressure in the lower chamber 220 can become higher than the pressure in the diffuser 100. Accordingly, it is possible to make the internal pressures of the upper chamber 210 and the lower chamber 220 the same, thereby being able to prevent the lower chamber 220 from unfolding first.

Alternatively, it is possible to change the volumes of the upper chamber 210 and the lower chamber 220 by changing the position where the separator 400 is coupled such the discharge hole 110 of the diffuser 100 can be formed at a position where it can communicate with the inside of the lower chamber 220 of the air cushion 200.

The automotive side air bag 1000 may be installed in a side of a seat, that is, at a position where the elbow of a passenger facing a door or the chest of a passenger is positioned, thereby being able to protect the chest by effectively lifting the arm of the passenger.

That is, when unfolding, the upper chamber 210 can cover the chest or the stomach of a passenger and the lower chamber 220 can cover the pelvis of a passenger.

As described above, according to the automotive side airbag 1000 of the present invention, the upper chamber 210 of the air cushion 200 lifts an arm of a passenger diagonally upward when unfolding due to a plurality of or one discharge hole 110, whereby it is possible to more effectively prevent an arm of a passenger from injuring the chest. Further, after the upper chamber 210 and the lower chamber 220 inflate in predetermined sizes, the gas in the upper chamber 210 is discharged through the vent hole 230 and the gas in the lower chamber 220 flows into the upper chamber 210 through the diffuser 100 to be able to be discharged through the vent hole 230, whereby it is possible to decrease the gas pressure in the air cushion 200.

FIG. 7 is a view showing a method of operating an automotive side airbag according to an embodiment of the present invention.

Referring to FIG. 7, a method of operating an automotive side airbag according to an embodiment of the present invention includes: sensing a collision of a vehicle (S100); operating the inflator 300 to eject gas into the air cushion 200 when a collision is sensed (S200); and supplying gas into the air cushion 200 through the discharge hole 110 formed across the unfolding direction of the air cushion 200 (S300).

A controller (not shown) according to an embodiment of the present invention can control a portion of the method of operating an automotive side airbag. The controller (not shown) may be an automotive ECU or a specific controller connected with the ECU and can sense a collision of a vehicle and can operate the inflator 300.

The controller (not shown) according to exemplary embodiments of the present invention can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

The method may further include unfolding the air cushion 200 forward from a side of a passenger (S400) after the supplying of gas (S300).

Although the present invention was provided above in relation to specific embodiments shown in the drawings, it is apparent to those skilled in the art that the present invention may be changed and modified in various ways without departing from the scope of the present invention, which is described in the following claims.

What is claimed is:

1. An automotive side airbag comprising:
   an inflator ejecting gas when operating;
   an air cushion expanded and unfolded forward from a side of a passenger by the gas ejected from the inflator;
   a diffuser disposed in the air cushion, supplying the gas ejected from the inflator to the air cushion, and having a discharge hole formed across a direction in which the air cushion is unfolded by the supplied gas; and
   a separator dividing an internal space of the air cushion into an upper chamber and a lower chamber, wherein the diffuser communicates with both of the upper chamber and the lower chamber, and wherein the separator is coupled to an outer side of the diffuser under the discharge hole.

2. The automotive side airbag of claim 1, wherein the air cushion expands toward a passenger or outward the passenger, and the discharge hole is formed in an expansion direction of the air cushion.

3. The automotive side airbag of claim 1, wherein the air cushion unfolds forward while expanding in a direction crossing the direction in which the air cushion unfolds.

4. The automotive side airbag of claim 3, wherein when the air cushion unfolds, an arm of a passenger is lifted diagonally upward.

5. The automotive side airbag of claim 1, wherein the discharge hole of the diffuser is formed toward a passenger or outward from the passenger.

6. The automotive side airbag of claim 5, wherein the discharge hole of the diffuser is formed as a plurality of pieces toward a passenger or outward from the passenger.

7. The automotive side airbag of claim 1, wherein a first assistant hole for supplying gas to the upper chamber and a second assistant hole for supplying gas to the lower chamber are formed at the diffuser.

8. The automotive side airbag of claim 1, wherein the discharge hole of the diffuser communicates with an inside of the upper chamber.

9. The automotive side airbag of claim 1, wherein the upper chamber covers the chest or the stomach of a passenger when unfolding, and the lower chamber covers the pelvis of the passenger when unfolding.

10. A method of operating the automotive side airbag of claim 1, the method comprising:

sensing a collision of a vehicle;

operating the inflator to eject gas into the air cushion when a collision is sensed; and supplying gas into the air cushion through the discharge hole of the diffuser formed across the direction in which the air cushion unfolds.

11. The method of claim 10, further comprising:

unfolding the air cushion forward from a side of a passenger after the supplying of gas.

* * * * *